US006491160B2

(12) United States Patent
Butler et al.

(10) Patent No.: US 6,491,160 B2
(45) Date of Patent: Dec. 10, 2002

(54) TRI-FOLD PROTECTIVE MAILER FOR STRESS-SENSITIVE ARTICLES

(75) Inventors: Todd N. Butler, Cincinnati, OH (US); Bryan W. Horn, Cincinnati, OH (US)

(73) Assignee: Butler Business Services, Inc., Hamilton, OH (US)

( * ) Notice: Subject to any disclaimer, the term of this patent is extended or adjusted under 35 U.S.C. 154(b) by 11 days.

(21) Appl. No.: 09/791,205

(22) Filed: Feb. 23, 2001

(65) Prior Publication Data

US 2002/0117410 A1 Aug. 29, 2002

(51) Int. Cl.$^7$ .............................................. B65D 85/57
(52) U.S. Cl. ..................... 206/232; 206/308.1; 229/92.8
(58) Field of Search ............................. 206/232, 308.1, 206/312; 229/92.8

(56) References Cited

U.S. PATENT DOCUMENTS

| | | | | |
|---|---|---|---|---|
| 3,726,471 A | | 4/1973 | Kalb ........................ 229/92.8 |
| 4,093,117 A | | 6/1978 | Morse ......................... 229/70 |
| 4,428,526 A | * | 1/1984 | Riley ......................... 229/92.1 |
| 4,936,769 A | * | 6/1990 | Schoenleber ............... 229/68.1 |
| 5,353,931 A | * | 10/1994 | Antik .......................... 206/232 |
| 5,460,265 A | * | 10/1995 | Kiolbasa ................... 206/308.1 |
| 5,620,097 A | | 4/1997 | Timmons, II et al. ....... 206/521 |
| 5,749,463 A | * | 5/1998 | Collins ..................... 206/308.1 |

* cited by examiner

Primary Examiner—David T. Fidei
(74) Attorney, Agent, or Firm—Wood, Herron & Evans, L.L.P.

(57) ABSTRACT

A tri-fold protective mailer for a stress-sensitive article. The protective mailer comprises a three-section, substantially-rectangular panel having a pocket on one outermost section for securing the stress-sensitive article. When the mailer is folded, the article is captured between the overlapping sections of the panel such that the stress-sensitive article is inaccessible from the exterior of the mailer. The pocket is positioned and configured such that the mailer can be handled by automated handling equipment without a significant risk of damage to the stress-sensitive article.

17 Claims, 3 Drawing Sheets

TRI-FOLD PROTECTIVE MAILER FOR STRESS-SENSITIVE ARTICLES

This invention relates to mailers and, in particular, to tri-fold mailers which are suitable for securing and protecting mailpieces, such as stress-sensitive articles, for safe handling by automated handling equipment.

BACKGROUND OF THE INVENTION

The United States Postal Service utilizes high-speed automated handling equipment for sorting the large volumes of mail that it handles daily. To that end, the automated handling equipment utilizes pairs of vertical moving belts arranged in a network to grip and serially transport mailpieces. The moving belts convey the mailpieces at a linear velocity approaching 500 to 600 feet per minute. Each mailpiece is oriented in a vertical plane such that a three (3) inch edge portion of the mailpiece is gripped between the moving belts. A sensor/translator is provided adjacent to the moving belts for identifying a destination post office for each mailpiece. Mailpieces are sorted according to the destination post office and routed by the network of moving belts into assorted collection bins. Changes in direction of transported mail in automated handling equipment are accommodated by providing a drum over which the moving belts are trained at the point where the direction change is to occur. For example, if the mailpiece is moving linearly in a horizontal direction and it is desired to effect a directional change to a different horizontal direction, a drum mounted for rotation about a vertical axis is placed at the change-of-direction point in the path of travel of the opposed belts between which the mailpiece is gripped for transport. As the belts move about the rotating drum, the mailpiece travels through a curved path conforming to the drum periphery and emerges traveling between the moving belts in a new horizontal direction.

Conventional mailers are available for packaging breakable, frangible or stress-sensitive articles, such as compact disks or mini-compact disks, in a manner suited for handling by the automated handling equipment. Automation-compatible mailpieces must comply with postal regulations such as size requirements and address positioning while protecting the stress-sensitive article from damage during sorting by the automated handling equipment, Moreover, postal regulations require the mailer to be flexible enough to be bent and routed about the circumference of a cylindrical drum having an eleven (11) inch diameter and a height of about three (3) inches of the type used in automated handling systems at locations where directional changes occur in the travel path of the belts.

Stress-sensitive articles packaged in conventional mailers have a significant risk of breakage or damage as the mailer is bent about the circumference of the cylindrical drum. As the mailer is conveyed about the exterior of the drum, the stress-sensitive article must curve or bow and will experience a state of tension due to the flexure that can damage or even break the article. Moreover, conventional mailers position the stress-sensitive article such that the moving belts may apply a significant contact pressure to the article capable of damaging the surface of the stress-sensitive article so as to, for example, corrupt the information encoded thereon. Thus, because of these and other significant shortcomings, conventional mailers do not adequately safeguard stress-sensitive articles for handling by automated handling equipment used by the United States Postal Service.

Accordingly, there is a need for a mailer for a stress-sensitive article that can be handled by automated handling equipment and that fully complies with postal regulations while protecting the stress-sensitive article from damage during transit and sorting.

SUMMARY OF THE INVENTION

A primary objective of the present invention is to provide a mailer for a stress-sensitive article such that the mailer can be bent and transported about the circumference of the cylindrical drums used in automated handling equipment without damaging the article. A further objective of the present invention is to provide a mailer for a stress-sensitive article that positions the article such that the belts of the automated handling equipment do not contact the area of the mailer containing the article. A particular objective of the invention is to provide a mailer for a stress-sensitive article that can ensure damage-free handling by automated handling equipment of the postal service while securing the article during transit from a sender to a recipient.

According to the principles of the present invention, a mailer is provided having a substantially rectangular first panel with a pair of transversely-oriented free ends and a first and a second transverse fold line. The first and second fold lines have a spaced relationship between the free ends of the first panel so as to divide the first panel into a first and a second outer section positioned longitudinally on opposite sides of a middle section when the mailer is in an unfolded state. A second panel is attached to the first outer section of the first panel. A pocket is collectively defined between the first and second panels and is dimensioned to receive the stress-sensitive article therein. The pocket has an opening facing the first transverse fold line for insertion and removal of the article. To define a folded state for securing the stress-sensitive article, the first outer section is folded at the second transverse fold line over the middle section to sandwich the second panel therebetween. The second outer section is folded over the middle section with the first outer section and the second panel located therebetween for securing the stress-sensitive article such that the article is inaccessible from the exterior of the mailer.

These and other objectives and advantages of the present invention will be more readily apparent from the following detailed description.

DETAILED DESCRIPTION

Figure 1:
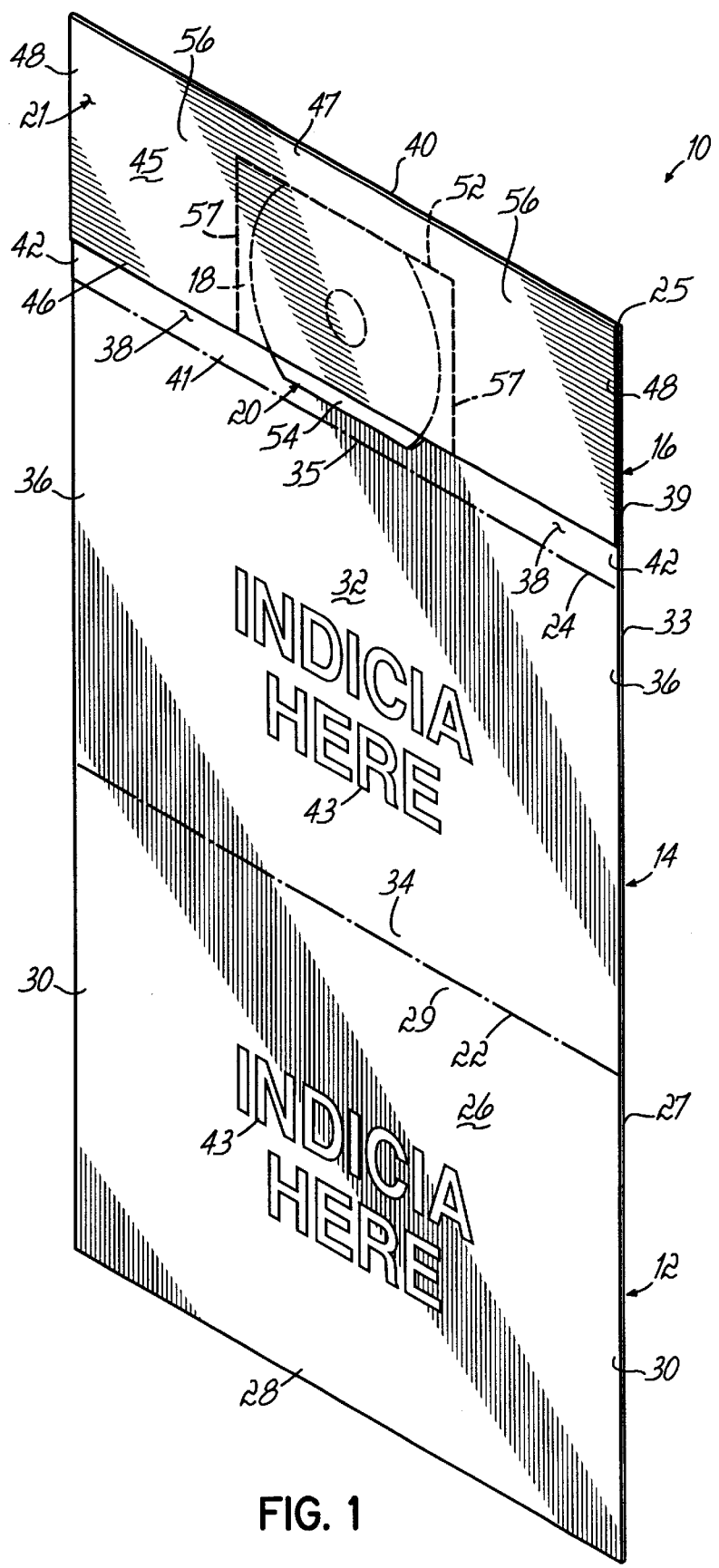
FIG. 1 is a perspective view of one embodiment of the mailer of the present invention in an unfolded state.
Figure 2:
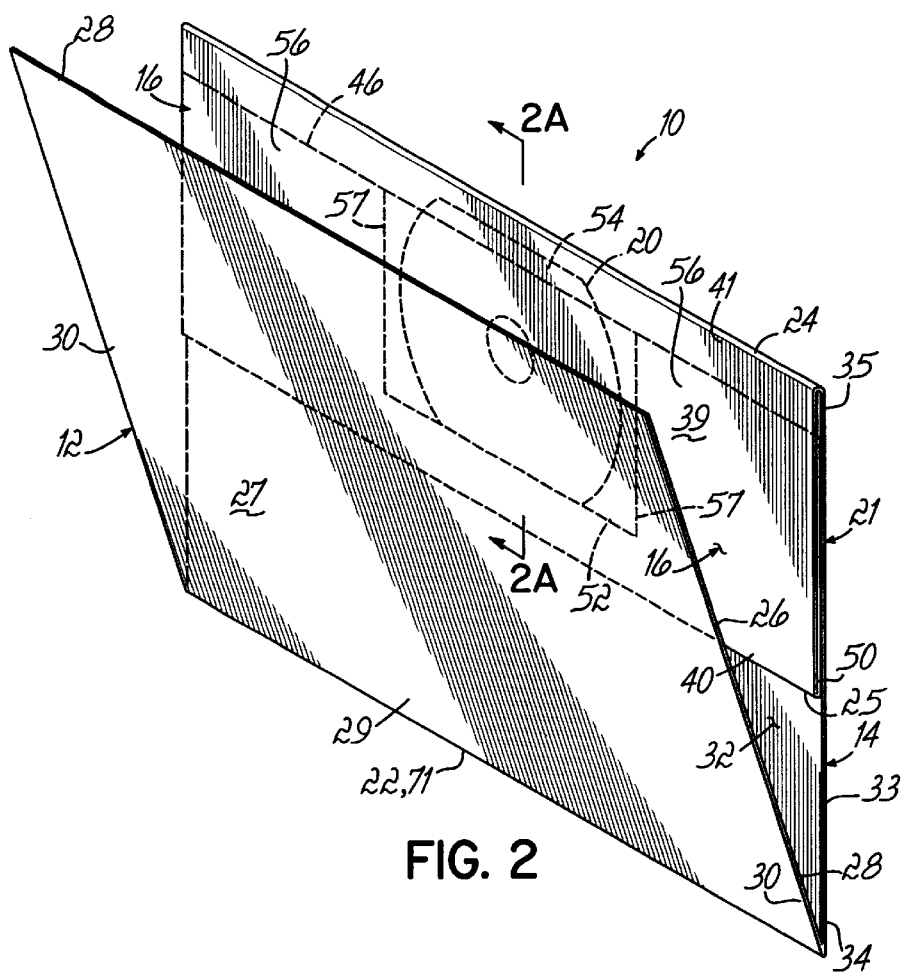
FIG. 2 is a perspective similar to FIG. 1 illustrating the mailer of the present invention in a folded state.

With reference to FIGS. 1 and 2, a mailer 10 according to the present invention comprises a first panel 12 adapted to be folded or bent over a second panel 14 and a third panel 16 also adapted to be folded over the second panel 14. The first and second panels 12, 14 are hingeably or foldably joined at a fold line 22 and the second and third panels 14, 16 are likewise hingeably or foldably joined at a fold line 24. Although fold lines 22, 24 need not be scored or otherwise defined, fold lines 22,24 may be scored or perforated to facilitate manual folding. The mailer 10 has an open or unfolded position, shown in FIG. 1, wherein the panels 12–16 are adjacent to each other in substantially the same plane and a closed or folded position, shown in FIG. 2, wherein the panels 12–16 are in substantially parallel planes atop each other or stacked in substantially parallel planes. The fold lines 22, 24 are substantially parallel to or transverse to the longest or major dimension of mailer 10 and have a spaced relationship to divide the mailer 10 into the trio of panels 12–16.

Figure 2A:
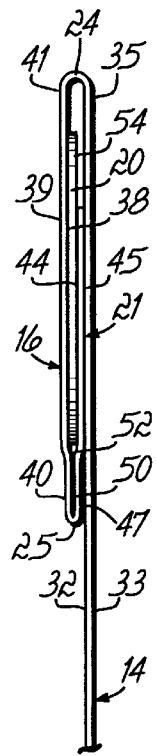
FIG. 2A is a cross-section taken generally along line 2A—2A in FIG. 2.

The mailer 10 includes a pouch or pocket 18 that is configured to hold and protect a stress-sensitive article 20. The pocket 18 is collectively formed as a space between a fourth panel 21 and the third panel 16 by attached portions 56 and the false bottom 52 provided by adhesive 50 (FIG. 2A). The pocket 18 includes an opening 23 oriented to face substantially toward the fold line 24 and dimensioned to receive the stress-sensitive article 20 therethrough for positioning within pocket 18. The third and fourth panels 16, 21 are hingeably joined at a fold line 25. It is understood by those of ordinary skill in the art that the fourth panel 21 is not limited to being integrally joined to third panel 16 in a hingeable fashion at the fold line 25 and, in certain embodiments, the fourth panel 21 can comprise an independent, separate panel interconnected by adhesive 50 (FIG. 2A) and attached portions 56 to panels 12–16 to create pocket 18.

Figure 3:
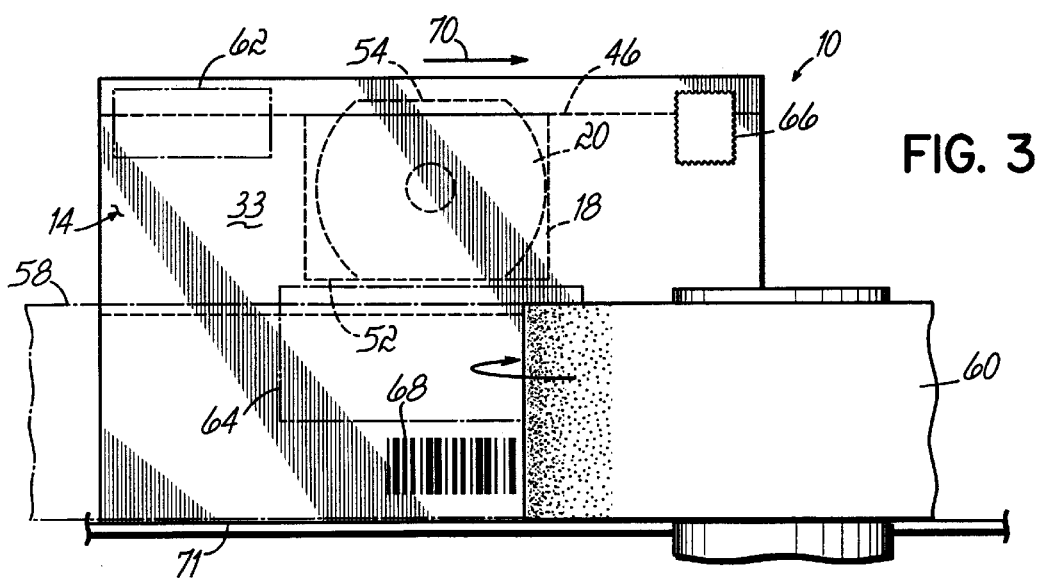
FIG. 3 is a schematic side view illustrating the mailer of the present invention being handled by automated handling equipment.
Figure 4:
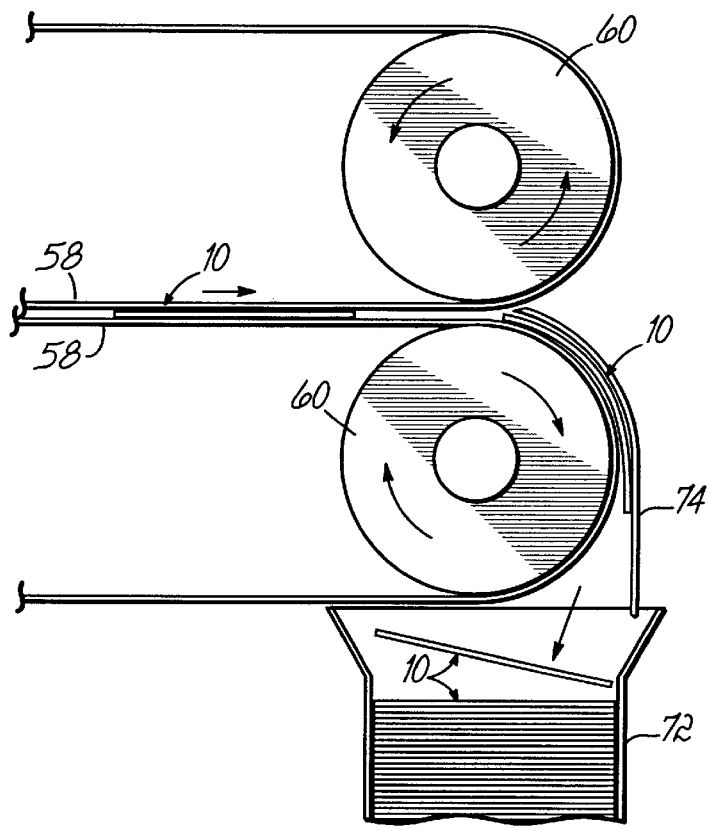
FIG. 4 is a schematic top view similar to FIG. 3, illustrating the handling of the mailer of the present invention by the automated handling equipment.

The paper stock or cardboard forming panels 12–16 and 21 is stiff enough to withstand handling in automated mail handling equipment without significant damage so as to protect the stress-sensitive article 20 that will be enclosed in the mailer 10, yet lightweight for purposes of manufacturability and to minimize mailing costs. The mailer 10 is constructed to substantially comply with United States Postal Service regulations governing automation-compatible mailpieces. To that end, the mailer 10 must have a height between 6.125 inches and 3.5 inches and a length between 5 inches and 11.5 inches, wherein length is the dimension parallel to the address when that address is read and the height is the dimension perpendicular to the length. Mailer 10 must have a ratio of length to height, or aspect ratio, between 1.3 and 2.5. Panels 12–16 are larger than the pocket 18 so that the mailer 10 can absorb corner denting, thereby protecting the stress-sensitive article 20 inside pocket 18. Further, postal regulations require that the mailer 10 and its contents, stress-sensitive article 20, bend easily when transported about an 11-inch diameter cylindrical drum 60, as shown in FIGS. 3 and 4.

With continued reference to FIGS. 1 and 2, the first panel 12 has an inner face 26, an outer face 27, a free end or first transverse end 28, a second transverse end 29 and a pair of lateral ends 30. Similarly, the second panel 14 has an inner face 32, an outer face 33 (FIG. 3), a first transverse end 34, a second transverse end 35 and a pair of lateral ends 36. The third panel 16 has an inner face 38, an outer face 39 (FIG. 2A), a free end or first transverse end 40, a second transverse end 41 and a pair of lateral ends 42. The fold line 22 is defined by the juncture of the second transverse end 29 of the first panel 12 and the first transverse end 34 of the second panel 14. Similarly, the fold line 24 is defined by the juncture of the second transverse end 41 of the third panel 16 and the second transverse end 35 of the second panel 14. The inner faces 26, 32 may carry a message, advertising material or other printed indicia 43. Although not shown, faces 27, 33, 39, and 45 may also carry printed indicia, similar to the printed indicia 43 on inner faces 26, 32 without departing from the spirit and scope of the present invention. In certain embodiments, panels 12–16 are substantially rectangular, as illustrated in FIGS. 1 and 2, but it is understood that the present invention is not so limited.

The fourth panel 21 has an inner face 44 (FIG. 2A), an outer face 45, a first transverse end 46, a second transverse or free end 47, and a pair of lateral ends 48. Referring to FIGS. 2 and 2A, an adhesive 50, such as an adhesive strip or plural dots of adhesive, is provided between the first transverse end 47 of fourth panel 21 and the first transverse end 40 of the third panel 16. The adhesive 50 is aligned transversely with an orientation that is substantially parallel to transverse ends 40, 47. The adhesive 50 defines a false bottom 52 between the third and fourth panels 16, 21 which limits the depth of the pocket 18 accessible to the stress-sensitive article 20. The width of the false bottom 52 controls a surface area or top edge 54 of the article 20 that is exposed above the first transverse end 46. The depth of the pocket 18 is measured perpendicular to the first transverse end 40 of the third panel 16 or, equivalently, perpendicular to the fold line 25, from the opening 23 to the false bottom 52. The inner face 44 of fourth panel 21 is attached, such as by an adhesive (not shown but similar to adhesive 50), on opposite sides of pocket 18 to the inner face 38 of third panel 16 to create a pair of attached portions 56. The attached portions 56 are generally rectangular and define a pair of lateral edges or inner peripheral edges 57. The linear separation between the inner peripheral edges 57 defines the lateral dimension of the pocket 18.

The dimensions of the pocket 18 are predetermined to accommodate the dimensions of the stress-sensitive article 20 and, if the article 20 is a magnetic or optical memory storage medium, to protect the vulnerable storage area of the article 20 from damage. The pocket 18 has a lateral dimension or width that is slightly greater than a first dimension of the stress-sensitive article 20 and a depth defined by the false bottom 52 that is slightly less than a second dimension of the article 20. When the stress-sensitive article 20 is fully received in pocket 18, the false bottom 52 permits the top edge 54 of the article 20 to be visible when the mailer 10 is in an unfolded state. Typically, the false bottom 52 of pocket 18 is defined such that a linear dimension, measured perpendicular to the fold line 24, of about 0.25 inches to about 0.5 inches of the top edge 54 is visible. However, the extent of the false bottom 52 is chosen to ensure that the nearest edge of the transport belts 58 (FIGS. 3 and 4) of the postal handling equipment do not contact any portion of the article 20 and defines the separation between the article 20 and the portion of mailer 10 gripped by the transport belts 58 (FIGS. 3 and 4). It is apparent that the false bottom 52 can be omitted in certain embodiments of mailer 10 without departing from the spirit and scope of the present invention so that the stress-sensitive article 20 abuts, or nearly abuts, the fold line 25. When the mailer 10 is in a folded state, the pocket 18 and the article 20 are substantially inaccessible from the exterior of the mailer 10 without unsealing and unfolding the mailer 10. In certain embodiments, it is understood by those of ordinary skill in the art that the mailer 10 may comprise a plurality of pockets 18 defined between the third and fourth panels 16, 21 as constrained by the transverse dimension of panels 16, 21 and the requisite transverse dimension of each of the plurality of pockets 18.

Because the top edge 54 of the stress-sensitive article 20 is exposed when the mailer 10 is unfolded, a recipient can readily determine whether or not the mailer 10 contains an article 20 without looking inside the pocket 18. Moreover, any printed matter on the exposed top edge 54 of the stress-sensitive article 20 can be readily viewed without withdrawing the article 20 from pocket 18. When the mailer 10 is in the folded state, the exposed portion of the stress-sensitive article 20 remains protected since article 20 is located in a secure position between the inner faces 32 and 38 of panels 14 and 16, respectively. When the mailer 10 is in the unfolded state, the recipient can readily grasp the exposed top edge 54 of stress-sensitive article 20 for slidably removing article 20 from the pocket 18.

Exemplary stress-sensitive articles 20 include frangible or breakable articles, such as articles formed of a plastic, and more specifically, frangible articles such as storage media containing information. Common storage media include disc-shaped compact disks or mini-compact disks having at least one information-bearing surface. A typical mini-compact disk, for example, has a maximum linear dimension of less than about 3.5 inches.

By way of example and not by way of limitation, the panels 12–16 may have a width of about 6 inches and a length of about 9 inches, with the pocket 18 dimensioned to contain a 2.4 inch by 3.1 inch mini-compact disk. The mini-compact disk is oriented with the shorter side generally aligned parallel to the folds of the panels 12–16 to provide a clearance of about 0.35 inches between the exposed top edge 54 and the nearest edge of the 3-inch wide transport belts 58 and the cylindrical drums 60 (FIGS. 3 and 4) of the automated handling equipment used to grip and transport the mailer 10. The false bottom 52 has a depth such that the exposed top edge 54 of the mini-compact disk, visible when the panels 12–16 are unfolded, has a linear dimension of about 0.25 inches.

Figure 5:
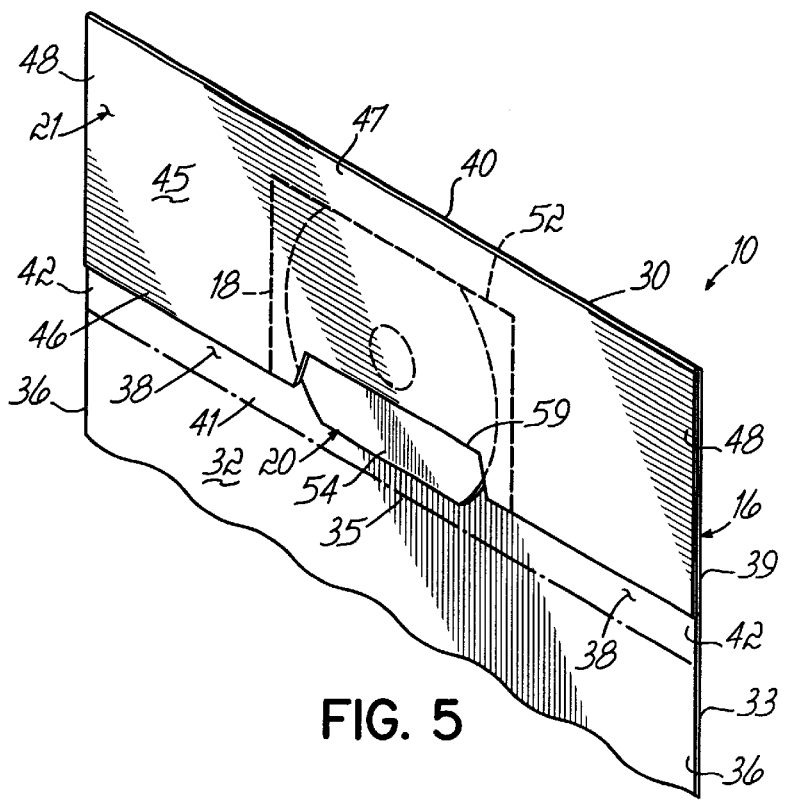
FIG. 5 is a partial perspective view, similar to FIG. 1, of one embodiment of the mailer of the present invention.

With reference to FIG. 5 and according to one embodiment of the present invention, the first transverse end 46 of the fourth panel 21 may further include a notch 59 that permits the stress-sensitive article 20 to sit deeper within the pocket 18 while still exposing a significant portion of top edge 54. In this embodiment, the engagement produced by the adhesive 50 (FIG. 2A) can be reduced in width to reduce the depth of the false bottom 52 or the adhesive 50 may even be eliminated so that the mailer 10 no longer includes a false bottom 52. In the latter instance, a portion of the stress-sensitive article 20 in pocket 18 can abut or nearly abut the fold line 25.

FIGS. 3 and 4 schematically illustrate the handling of the mailpieces, such as mailer 10, by conventional automated handling equipment comprising moving belts, such as transport belt 58, and rotating drums, such as cylindrical drum 60. The cylindrical drum 60 is used to change the direction of motion of the transport belts 58 and, thereby, to redirect the travel path of mailpieces, such as mailer 10, gripped between the transport belts 58. In such conventional automated handling equipment, transport belt 58 has a width of about 3 inches and the cylindrical drum 60 has a diameter of about 11 inches and a width of about 3 inches. Typically, a pair of transport belts 58 grasp a 3-inch wide height of the opposed parallel faces of each mailpiece, such as mailer 10, and transport the mailer 10 along a travel path for a purpose such as sorting. The transport belts 58 are wound about and driven by the cylindrical drums 60 such that the mailer 10 must traverse a curved path about the circumference of cylindrical drum 60 in that portion of the travel path.

With reference to FIG. 3, a return address 62, a destination address 64, postage indicia 66, and a bar code 68 are typically provided on the outer face 33 of second panel 14. The destination address 64 is printed such that the address is parallel to the longest dimension or length of mailer 10. Mailpieces, such as mailer 10, are usually oriented by postal handling equipment such that the destination address 64 of each mailpiece faces a consistent direction and with a consistent vertical orientation. Specifically, the longest dimension or length of the mailer 10 is aligned parallel to the direction of motion, indicated generally by arrow 70. As a result, the bar code 68 is positioned such so that optical readers can be reliably positioned to sense the information encoded in bar code 68 for sorting the mailer 10 according to the destination address 64. The orientation of mailer 10 between transport belts 58 ascribes a bottom edge 71 to mailer 10, for purposes of reference only. According to the present invention, the stress-sensitive article 20 within the pocket 18 of mailer 10 is always positioned, relative to the bottom edge 71, above the vertical extent of the transport belts 58 so that neither of the transport belts 58 can contact the portion of mailer 10 directly overlying the article 20. Thus, the pocket 18 is configured such that the nearest portion of the exposed top edge 54 of the stress-sensitive article 20 is disposed at least 3 inches distant vertically from the bottom edge 71 of mailer 10.

With reference to FIGS. 3 and 4, mailer 10 is bent about the exterior of cylindrical drum 60 to change the direction of the travel path of mailpieces, such as for stacking the mailer 10, along with other mailpieces, in a bin or receiver 72. In the vicinity of the cylindrical drum 60, the mailer 10 is constrained between transport belt 58 and a curved guide rail 74 and subsequently follows a curved path about the outer circumference of the cylindrical drum 60. According to the present invention, the pocket 18 is positioned relative to the bottom edge 71 of mailer 10 such that the nearest portion of the stress-sensitive article 20 is always above and out of contact with the 3-inch vertical extent of the exterior surface of the drum 60. Because the flexing of the mailer 10 near the pocket 18 is significantly reduced, the risk of damaging or breaking the stress-sensitive article 20 is significantly reduced when the mailer 10 moves in a curved path about the outer circumference of the cylindrical drum 60.

In use, the stress-sensitive article 20 is positioned through the opening 23 into pocket 18. The third and fourth panels panel 16, 21 are folded at the fold line 24 to extend over the inner face 32 of the second panel 14 such that the stress sensitive article 20 and fourth panel 21 are sandwiched between the second and third panels 14, 16. The first panel 12 is folded at the fold line 22 to extend over the outer face 39 of the third panel 16 and an exposed portion of the inner face 32 of the second panel 14 to establish a folded or closed state. In the folded state, the stress sensitive article 20 and the third and fourth panels 16, 21 are sandwiched between the second and third panels 14, 16 and the stress-sensitive article 20 is inaccessible from the exterior of the mailer 10. A sealing member (not shown), such as an adhesive or a tape, is used to adhere the third panel 16 to the second panel 14 for sealing the mailer 10. When the mailer 10 is in a folded state, the stress-sensitive article 20 is protected from damage and the article 20 is secured from becoming dislodged. The sender addresses the mailer 10 with at least the destination address 64 by any conventional means, such as typing or printing, and attaches the postage indicia 66. The mailer 10, in a closed state and sealed, is routed from the sender to the destination address 64 via the postal service, which typically utilizes automated handling equipment for sorting the mailer 10 according to the destination address 64. The recipient opens the mailer 10 by compromising the sealing member and unfolding the panels 12–16 to the unfolded or open state. After unfolding, the printed indicia 43 carried by the inner faces 26 and 32 of panels 12, 14 will be visible to the recipient and the stress-sensitive article 20 will be exposed for ready identification and removal by the recipient.

While the present invention has been illustrated by the description of embodiments example thereof, and while the embodiments have been described in considerable detail, they are not intended to restrict or in any way limit the scope of the appended claims to such detail. Additional advantages and modifications will readily appear to those skilled in the art. For example, the panel 21 may incorporate a window formed of a transparent material to accommodate viewing of the stress-sensitive article 20 in the pocket 18. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A mailer for handling by postal handling equipment, comprising:
   a first panel;
   a second panel joined foldably to said first panel by a first transverse fold line;
   a third panel joined foldably to said second panel by a second transverse fold line, said second transverse fold line being aligned substantially parallel to said first transverse fold line, said third panel being substantially shorter in a direction perpendicular to said first and said second transverse fold lines than said first and said second panels; and
   a fourth panel attached to the third panel so as to define a pocket dimensioned to receive a frangible article therein, said mailer having an unfolded condition in which the frangible article is insertable into and removable from said pocket and a folded condition in which said third panel is folded at the second transverse fold line over said second panel sandwiching said fourth panel and said pocket therebetween and said first panel is folded at the first transverse fold line over the second panel sandwiching said third and said fourth panels located therebetween, said third panel partially overlying said second panel and said first panel substantially overlying said second panel when said mailer is in the folded condition such that said pocket is spaced from said first transverse fold line for preventing damage to the frangible article resulting from handling by postal handling equipment.

2. The mailer of claim 1, wherein said fourth panel is adhesively bonded to said third panel for defining the depth of said pocket measured in the perpendicular direction second transverse fold line such that a portion of the article is exposed when said mailer is in the unfolded condition.

3. The mailer of claim 2, wherein the pocket has a depth adapted to expose about 0.25 inch to about 0.5 inch of a linear dimension of a surface of the frangible article when said mailer is in the unfolded condition.

4. The mailer of claim 2, wherein said pocket has an opening facing said second transverse fold line, said opening having a notch such that the depth of said pocket can be reduced while still exposing a portion of the frangible article when said mailer is in the unfolded condition.

5. The mailer of claim 2, further comprising a frangible article positioned within said pocket.

6. The mailer of claim 1, wherein said pocket is spaced from said second transverse fold line such that the nearest portion of the frangible article is at least 3 inches distant from said first transverse fold line when said mailer is in the folded condition.

7. The mailer of claim 1, wherein said fourth panel is integrally joined to said third panel at a third transverse fold line aligned substantially parallel to said first and said second transverse fold lines.

8. The mailer of claim 1, further comprising a frangible article positioned within said pocket.

9. The mailer of claim 8, wherein said frangible article is formed of a plastic.

10. The mailer of claim 1, wherein each of said first and said second panels comprises an inner face that is concealed when said mailer is in the folded condition, at least one of said inner faces having printed indicia disposed thereon.

11. The mailer of claim 1 wherein said first panel, said second panel, and said third panel are substantially rectangular.

12. The mailer of claim 1 wherein said mailer is configured to be handled by automated handling equipment without damaging the frangible article.

13. The mailer of claim 1 wherein said mailer is formed from a material selected from the group consisting of paper stock and cardboard.

14. The mailer of claim 1 wherein said mailer is constructed to substantially comply with United States Postal Regulations governing letter-size, automation-compatible mailpieces.

15. The mailer of claim 1 wherein said mailer in the folded condition has a height between 3.5 inches and 6.125 inches and a length between 5 inches and 11 inches.

16. The mailer of claim 15 wherein a ratio of said length to said height in the folded condition is between 1.3 and 2.5.

17. The mailer of claim 1 wherein said pocket has an opening facing said second transverse fold line that permits insertion and removal of the frangible article from said pocket.

* * * * *

UNITED STATES PATENT AND TRADEMARK OFFICE
CERTIFICATE OF CORRECTION

PATENT NO.    : 6,491,160 B2
DATED         : December 10, 2002
INVENTOR(S)   : Butler et al.

It is certified that error appears in the above-identified patent and that said Letters Patent is hereby corrected as shown below:

Column 4,
Lines 48 and 49, read "0.25 inches ... 0.5 inches" and should read -- 0.25 inch ... 0.5 inch --.

Column 5,
Lines 28 and 35, read "0.35 inches ... 0.25 inches" and should read -- 0.35 inch ... 0.25 inch --.

Column 6,
Line 44, reads "fourth panels panel 16" and should read -- fourth panels 16 --.

Column 7,
Line 20, reads "spirit of applicant's general" and should read -- spirit of applicants' general --.

Column 7, line 54 to Column 8, line 1,
Reads "perpendicular direction second transverse" and should read -- perpendicular direction to the second transverse --.

Signed and Sealed this

Fifteenth Day of July, 2003

JAMES E. ROGAN
*Director of the United States Patent and Trademark Office*